United States Patent [19]

Goebel

[11] Patent Number: 4,890,661
[45] Date of Patent: Jan. 2, 1990

[54] TIRE DEMOUNTING TOOL

[75] Inventor: Eickhart Goebel, Pfungstadt, Fed. Rep. of Germany

[73] Assignee: Hofmann Werkstatt-Technik GmbH, Fed. Rep. of Germany

[21] Appl. No.: 229,525

[22] Filed: Aug. 8, 1988

[30] Foreign Application Priority Data

Aug. 7, 1987 [DE] Fed. Rep. of Germany ....... 3726409

[51] Int. Cl.$^4$ .............................................. B60C 25/04
[52] U.S. Cl. ...................................... 157/1.3; 157/1.17
[58] Field of Search ............................... 157/1.17, 1.3

[56] References Cited

U.S. PATENT DOCUMENTS 4,588,011  5/1986  Goebel ............................... 157/1.17
4,610,287  9/1986  Rach et al. ......................... 157/1.17

FOREIGN PATENT DOCUMENTS 3520801 12/1986 Fed. Rep. of Germany ..... 157/1.17
418311   2/1947 Italy ...................................... 157/1.3

Primary Examiner—James G. Smith
Attorney, Agent, or Firm—Cushman, Darby & Cushman

[57] ABSTRACT

A tire demounting apparatus for a tire secured to a wheel rim, having a actuating lever, pivotably supported on the wheel about a first pivot axis, and a tire bead holder pivotably supported on the actuating lever about a second axis. The tire bead holder has an engagement portion engaging the tire bead. Upon pivoting of the actuating lever in the intended demounting pivot direction, the tire bead holder engaging the tire bead pivots in the opposite direction on the actuating lever, thereby engaging a tire bead portion to be released. The portion engaged by the tire bead holder is initially moved radially inward out of range of the wheel flange, and then in the axial direction away from the wheel. The tire demounting apparatus also includes a stop which limits the pivoting motion of the tire bead holder on the actuating lever oriented opposite the demounting pivoting direction of the actuating lever.

14 Claims, 6 Drawing Sheets

TIRE DEMOUNTING TOOL

BACKGROUND OF THE INVENTION

The invention relates to an apparatus for demounting a tire secured to a wheel rim having an actuating lever supported on the wheel about a first pivot axis and a tire bead holder pivotably supported on the actuating lever about a second axis. The tire bead holder engages the bead of the tire.

A demounting apparatus of this type for pneumatic vehicle tires, which have their beads on wheel rims having radially inwardly oriented encompassing wheel flanges (see the journal "Gummibereifung" [Rubber Tires], Jananuary 1984, pp. 62–65), and in which the sidewalls of the tires wrap from the outside around the wheel flanges, is known from German Published, Unexamined Patent Application No. 35 24 664. In the known tire demounting tools, as the actuating lever pivots in the direction intended for the demounting operation, the tire bead holder engaging the tire bead pivots in the opposite direction on the actuating lever, engaging a portion of the tire bead to be released. The portion engaged by the tire bead holder is initially moved radially inward out of range of the wheel flange and then in the axial direction away from the wheel. In the known tire demounting tools, the tire bead holder shifts from a radially inwardly oriented motion into a motion oriented axially away from the wheel whenever the force exerted on the portion of the bead to be removed by the tire bead holder is approximately equal to the biasing force, provided by a spring, between the actuating lever and the tire bead holder.

SUMMARY OF THE INVENTION

It is an object of the present invention to provide a tire demounting tool for removal of a tire secured to a wheel rim, in which the transition from the radially inward motion of the tire bead holder engaging a portion of the tire bead to the phase of motion oriented axially away from the wheel is attained independently of a spring biasing force.

This and other objects of the present invention are achieved by providing a stop that limits the pivot motion of the tire bead holder on the actuating lever oriented oppositely to the demounting pivot direction of the actuating lever. This object and others are further achieved by disposing the engagement portion of the tire bead holder in such a way relative to the first pivot axis, that when the stop is engaged and upon further motion of the actuating lever in the demounting pivoting direction, the engagement portion of the tire bead holder has an axial motion component. This axial motion component permits the tire bead portion to be released and guided axially past the wheel flange.

In this way, a complete release of the portion of the tire bead engaged by the tire bead holder from the vicinity of the wheel flange is assured, especially with the radially inward motion. In the ensuing axial motion oriented away from the wheel, the portion of the bead to be released is reliably moved past the radially inwardmost edge of the wheel flange so that it moves out of range of the wheel flange.

To prevent the engagement portion of the tire bead holder from slipping away from the potion of the tire bead to be released during the radially inward motion, a fourth component oriented axially away from the rim is exerted upon the bead portion to be released via the engagement portion. This is achieved because at the engagement portion, a force oriented toward the second pivot axis (force vector) has not only the radial component but an axial component as well.

In that case, a spring force incorporated between the actuating lever and the tire bead holder is unnecessary. However, if such a spring force is provided, especially in the form of the spring known from German Published, Unexamined Application No. 35 24 664 or a correspondingly embodied compression spring, which biases the second pivot axis in the demounting pivoting direction, then it is additionally possible to assure that the engagement portion is pressed against the bead portion to be released, thus assuring reliable retention of the engagement portion on the bead portion. This spring also makes it possible to generate a predominantly axial force vector in the first pivoting phase of the actuating lever, that is, in the demounting pivoting direction. This vector presses the engagement portion between the bead portion to be released and the radially inward wheel rim surface.

In order to attain a satisfactory contact with the engagement portion of the tire bead holder on the bead portion to be released, a corresponding recess may be provided on the tire bead and/or on the radially inwardly located rim surface. In that case, it may no longer be necessary for a spring force to be operative between the tire bead holder and the actuating lever, if it can be assured that during the demounting operation the engagement portion of the tire bead holder remains in engagement with the bead portion to be released.

The spring force between the tire bead holder and the actuating lever is dimensioned such that, upon the pivoting of the actuating lever in the demounting pivot direction, this spring force gradually pivots the demounting tool on the actuating lever about the second axis, so that until the stop which limits the pivoting motion of the tire bead holder on the pivot lever is engaged, the engagement portion is assured to move radially inward along with the bead portion to be released. As soon as the stop is engaged, the radially inwardly guided motion of the engagement portion is shifted into the phase of motion oriented axially away from the wheel, during which phase the portion of the tire bead to be released from the wheel flange is finally guided out of range of the wheel flange.

In the event that a spring force is incorporated between the actuating lever and the tire bead holder, it may also be in the form of a compression spring, which is supported on the tire bead holder and acts upon a tension bolt articulated on the actuating lever. The stop for limiting the pivot motion of the demounting tool may be provided by means of a loose sleeve slipped over this compression spring.

A further stop, against which the tire bead holder rests in its position of repose, may also be provided, in particular on the actuating lever.

The disposition of both the first and second pivot axis and the engagement portion relative to one another should be such, by suitable embodiment of the actuating lever and tire bead holder, that after the axial phase of motion oriented away from the rim, in a further pivoting motion of the tire bead holder in the demounting pivot direction about the second pivot axis, the engagement portion has a radially outwardly oriented motion component with respect to the axis of the rim. This pivoting motion of the tire bead holder can also be imparted by the spring force incorporated between the actuating lever and the tire bead holder. If such a spring force is lacking, then the aforementioned radially outwardly oriented motion component can also be attained by means of a further pivoting motion of the actuating lever about the first pivot axis, carrying the tire bead holder along with it.

The actuating lever can also be supported on the wheel by means of rollers, in particular during the demounting operation. By this means, the aforementioned radially outwardly oriented motion of the engagement portion can be further reinforced with the raised portion of the tire bead.

In order for the actuating lever to maintain its position supported on the wheel during the demounting operation, and in particular during the inwardly oriented radial motion of the engagement portion, a support device supportable on the wheel can be provided on the actuating lever, to absorb a radially inwardly directed force component. Preferably this support device is pivotably articulated on the actuating lever. Particularly if the pivot axis of the support device coincides with the first pivot axis, it is assured that the pivot axis will maintain its position during the radially inwardly oriented motion of the portion of the tire bead to be released and will not vary in the plane of the tire. This makes it possible to embody the region of contact of the actuating lever with the rim or tire in such a way that the rim or tire is engaged gently. If the aforementioned rollers are used for supporting the actuating lever, then the support device prevents shifting during the demounting operation.

The support device is preferably supported at two support points on the wheel, and in particular on the tire. The two support points are spaced apart from the engagement portion of the tire bead holder on the tire bead in such a way that satisfactory release of the bead portion to be released remains assured. The support points may be adjustable, for adaptation to various tire sizes. To this end, they may be embodied as both radially and tangentially adjustable.

The support points may be provided on the support device in the form of support prongs.

The support device may also have a support hoop, extending approximately over one-half the inside circumference of the tire, and the support points in the form of the support prongs may be disposed displaceably on this support hoop.

The invention will now be described in further detail in terms of preferred embodiments, shown in the drawings.

DESCRIPTION OF THE PREFERRED EMBODIMENTS

Figure 1:
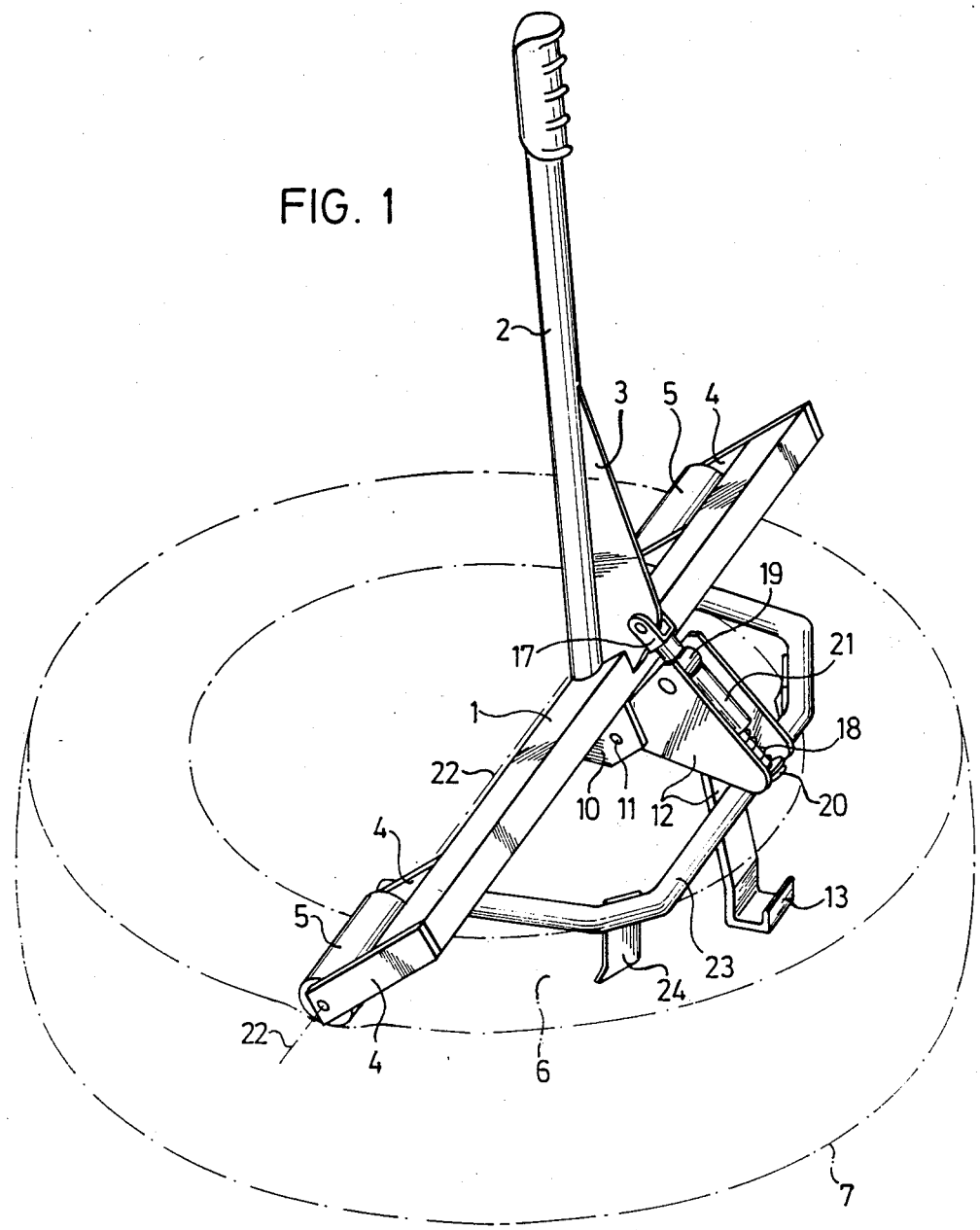
FIG. 1 is a perspective view of a tire demounting tool in a preferred embodiment of the invention.

The embodiments of a tire demounting tool 100 shown in FIGS. 1-6 have a transverse member 1 with a centrally and vertically arranged actuating lever 2. These two elements are reinforced with a gusset plate 3. Thrust bearings, which in the preferred embodiments are embodied as rollers 5, are attached to the ends of the transverse member 1, via outriggers 4. In the demounting operation, these rollers rest on a lateral outside face 6 of a tire 7 to be demounted. The demounting forces are reinforced, via a wheel flange 8 of a rim 16, by the thrust bearings embodied as rollers 5. The outriggers 4 serve primarily to span a portion 9 of the body of the wheel rim 16. To this end, the outriggers 4 are embodied as high enough that in the demounting operation the transverse member 1 does not touch the rim body 9, even if the rim body should axially protrude beyond one of the wheel flanges 8 or the lateral outside face 6 of the tire 7. Further outriggers 10 are secured in the middle of the transverse member 1, on the opposite side from the actuating lever 2. The transverse member 1, the gusset plate 3, the outriggers 4, the thrust bearings 5 and the outriggers 10 are connected to the actuating lever 2.

A tire bead holder 12 is pivotably supported about a pivot axis 11 on the outriggers 10. The front end of the demounting tool 12 forms an engagement portion engaging a portion of the tire bead to be lifted, and in the preferred embodiments shown is shaped into a hook-like demounting claw 13. At an engagement point 14, this demounting claw 13 can grasp a bead portion 15' of a tire bead 15 to be released from the wheel flange 8. The engagement point 14 is located between the outer circumferential portion of the bead 15 or bead portion 15' and the inner circumferential portion of the bead seat in the rim 16 (see FIG. 2).

Figure 6:
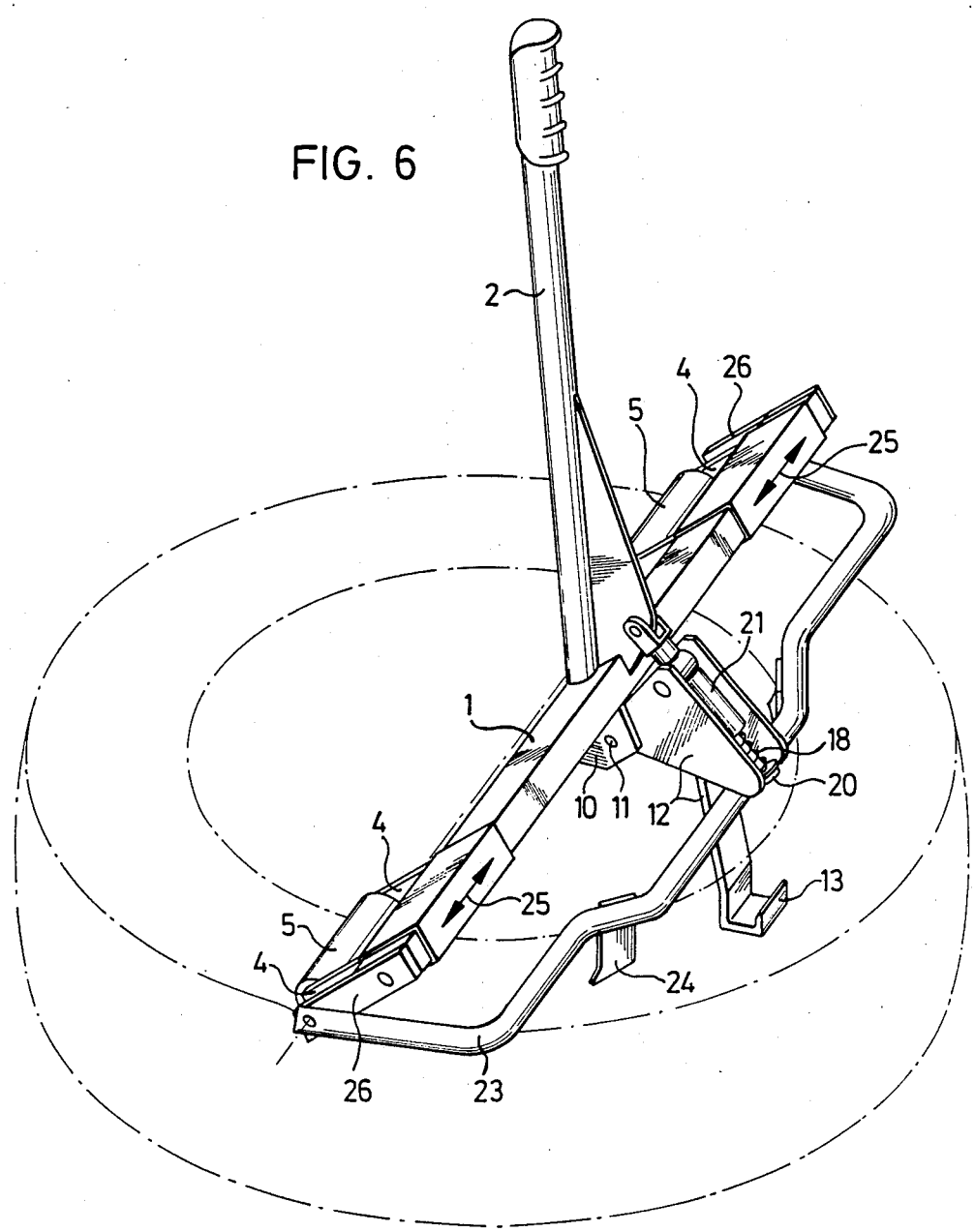
FIG. 6 is a perspective view of a further preferred embodiment of the tire demounting tool.

A straddling element 17 is pivotably supported on the gusset plate 3. A compression spring 18, which imparts a spring force between the tire bead holder 12 and the actuating lever 2 and correspondingly on the associated parts namely transverse member 1, gusset plate 3, outriggers 4, thrust bearings 5 and outriggers 10, presses against a hinge bolt 19 of the tire bead holder 12. The hinge bolt 19 is axially parallel to the pivot axis, and the pressure exerted upon it presses the tire bead holder 12 against the straddling element 17, which acts as a stop. The compression spring 18 is biased by means of a screw 20 (tension bolt) subjected to tension. This screw 20 is guided by a transverse bore 19' of the hinge bolt 19 and is secured in the straddling element 17. The compression spring 18 is supported on one end on the side of the tire bead holder 12 on the hinge bolt 19, which is secured on the tire bead holder 12 The other end of the compression spring 18 is supported against a head of the screw 20 and in this way exerts the required tension upon the screw 20, so that in the position of repose, as shown in FIGS. 1 and 6, the tire bead holder 12 and the gusset plate 3 rest on one another on the hinge bolt 19 and straddling element 17. If the tire bead holder 12 pivots clockwise about the pivot axis 11, the compression spring 18 is biased further via the hinge bolt 19. This kind of pivoting motion, as will be described below, arises whenever the actuating lever 2 in the preferred embodiments shown is pivoted counterclockwise for the demounting operation, in the direction of an arrow 28 (FIG. 2), which indicates a demounting pivoting direction.

The clockwise pivoting of the tire bead holder 12 about the pivot axis 11 and the force of the compression spring 18—if the compression spring 18 is provided—are limited by a stop tube 21, in the demounting operation, as will be described in detail below. In the preferred embodiment shown, the stop tube 21 loosely surrounds the compression spring 18 and is located between the hinge bolt 19 and the head of the screw 20.

When the stop tube 21 comes into action as a stop, it is clamped in between the hinge bolt and the head of the screw 20. In this way the entire range of the pivoting motion of the tire bead holder 12 about the pivot axis 11 is defined. This range of the pivoting motion is determined by the mobility of the hinge bolt 19, which in the position of repose meets the straddling element 17 and otherwise, via the stop tube 21, meets the head of the screw 20.

Figure 2:
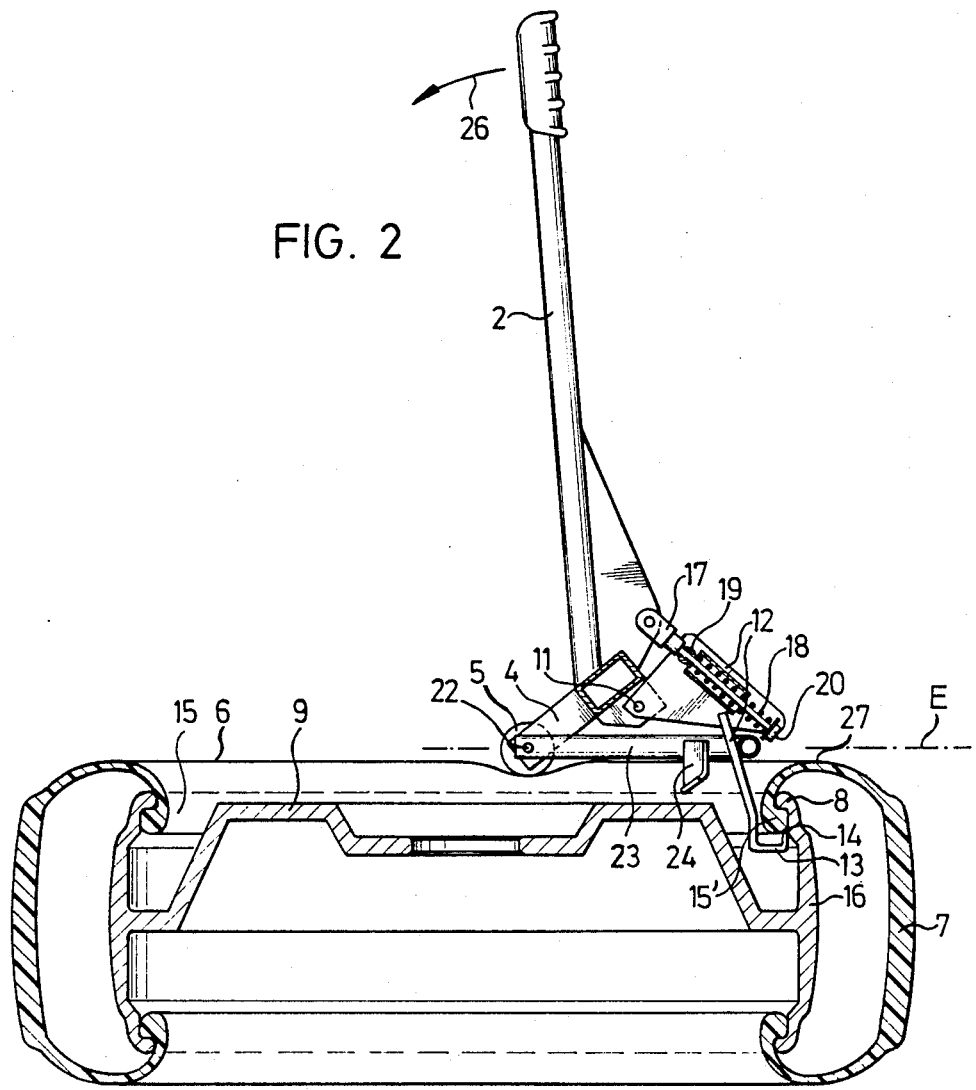
FIGS. 2-5 are sectional views of various phases in the demounting process using the tire demounting tool shown in FIG. 1.

In the preferred embodiments shown in FIG. 1 and 6, the thrust bearings embodied as rollers 5 are embodied as rotatable about a pivot axis 22 at the lower ends of the outriggers 4. Also supported at this pivot axis 22, in the preferred embodiment of FIG. 1, is a support hoop 23. The support hoop 23 extends radially outside around the demounting tool 12, from the insides of the outriggers 4 outward, and substantially follows along the inner circumferential radius of the tire 7. In the position of repose of the support hoop 23, the middle portion of the hoop 23 rests free of force, with little play, at an angle determined by the lower horizontal edge of the tire bead holder 12 and the front face of the vertically inclined claw portion of the demounting claw 13 on the tire bead holder 12. The position at this angle can be made compulsory by means of the compression spring 18, in the preferred embodiment shown. In the position of repose, the compression spring 18 presses the tire bead holder 12 with its hinge bolt 19 against the straddling element 17, which functions as a stop. The support hoop 23 is retained in the raised position, as also shown in FIG. 2, by the forward, obliquely downwardly oriented face of the connecting piece between the demounting claw 13 and the pivot body, articulated in the pivot axis, of the tire bead holder 12. Naturally, the position of repose of the support hoop 23 can be further reinforced by means of an additional spring.

Two support prongs 24 are disposed on the support hoop 23, which extend axially into the wheel directly at the wheel flange 8 or tire bead 15. During the demounting operation, they rest there and reinforce radial demounting forces on the wheel flange 8. The support prongs 24 are remote enough from the tire bead holder 12 or demounting claw 13 that they do not hinder the radial and axial motion of the bead portion 15', which is to be lifted in the vicinity of the engagement point 14 (FIG. 2). In the embodiments shown, the support hoop 23 and the support prongs 24 form a support device for intercepting radially inwardly oriented force components that arise during the dismounting operation.

In a preferred embodiment shown in FIG. 6, the thrust bearings embodied by the rollers 5 may also be adapted to highly varying wheel diameters, so that they always rest in the vicinity of the encompassing wheel flange 8 or on the lateral outside face 6 of the tire 7. To this end, the rollers 5 located on the end of the outriggers 4 can be longitudinally displaced in the direction of a double arrow 25 on the transverse member 1. The support hoop 23 is supported on two additional outriggers 26, which are provided on the ends of the transverse member 1. The support hoop shown in FIG. 6 is adapted to the largest possible wheel diameter. In the free space between the arms of the support hoop 23, the thrust bearings embodied as rollers 5 can be adjusted accordingly, depending on the various wheel diameters, so that a rim body 9 protruding outward beyond the lateral outside faces 6 of the tire can be taken into account as well.

The demounting operation for the two exemplary embodiments shown in FIGS. 1 and 6 will now be described in detail, referring to FIGS. 2–5.

At the beginning of the demounting operation, the tire demounting tool 100 is placed on the wheel, as shown in FIG. 2. The thrust bearings embodied as rollers 5 rest on the lateral outside face 6 of the tire 7. The hook-like demounting claw 13 is placed underneath the tire bead 15 on the portion 15' to be lifted, so that at the engagement point 14, the demounting claw 13 engages it between the radially outer face of the tire bead 15 and the radially inner face of the rim 16.

To attain satisfactory engagement of the demounting claw 13 at the engagement point 14, a suitable recess (not shown in the drawing) can be provided on the tire bead 15 and/or rim 16 at the engagement point 14.

For demounting, the actuating lever 2 is pivoted in the direction of the arrow 28 (demounting pivoting direction), and because of the biasing force of the compression spring 18, both the hook-like demounting claw 13 and the entire tire demounting tool 100 execute a circular motion about the pivot axis 22, in a first demounting phase. Initially, with a predominantly axial force vector with respect to the wheel (in the preferred embodiments shown, this is vertical), the demounting claw 13 that embodies the engagement portion of the tire bead holder 12 is pressed at the engagement point 14 behind the tire bead. The rollers 5 resting on the lateral outer face 6 of the tire 7 are now pressed so far into the elastically indented side wall 27 of the tire that the counteracting force of the wheel flange 8 is intercepted.

Figure 3:
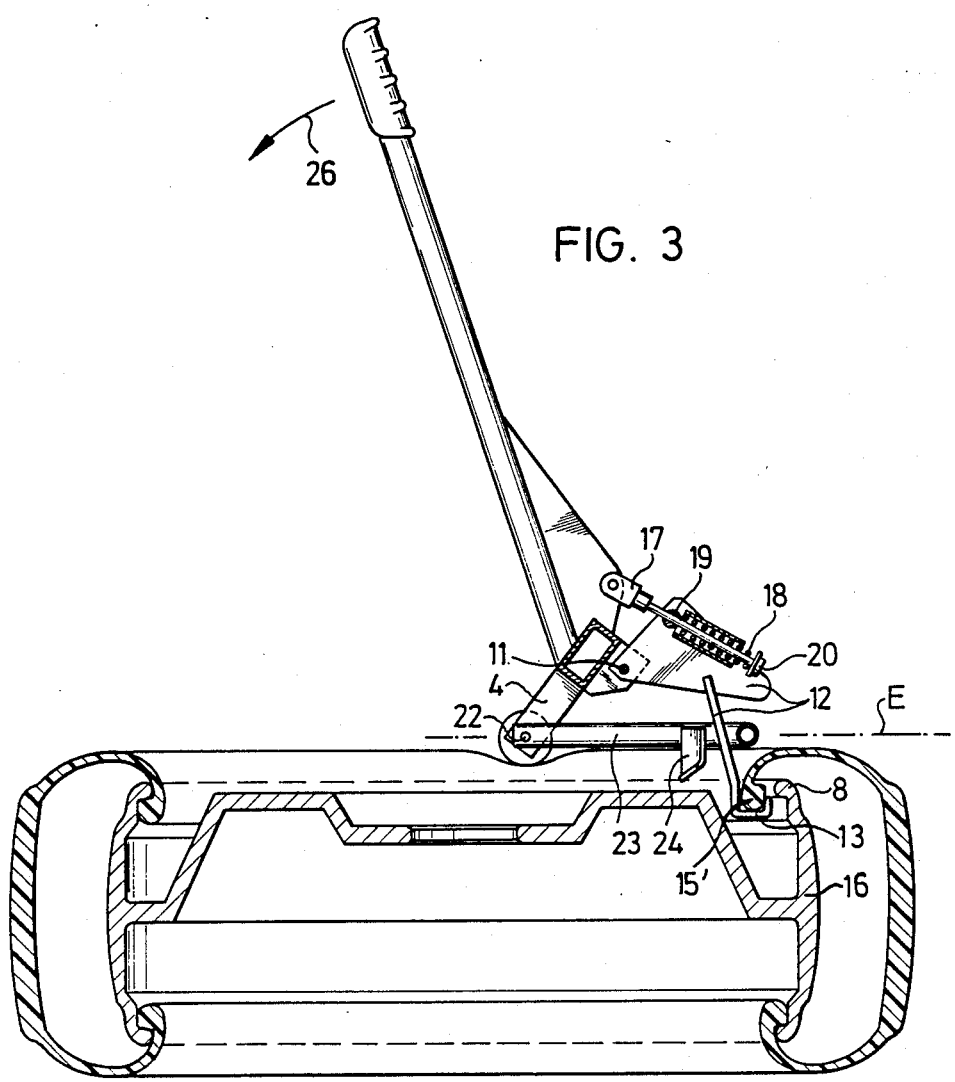

By means of the predominantly axial (in the illustrated preferred embodiments, vertical) force vector, a torque is also generated on the tire bead holder 12 clockwise about the pivot axis 11. Whenever this torque, upon continued motion of the actuating lever 2 in the demounting pivoting direction (arrow 26), exceeds the opposed torque because of the biasing of the compression spring 18, the second demounting phase is initiated. At this time, the hinge bolt 19 of the tire bead holder 12 disengages from its stop on the straddling element 17, so that the tire bead holder 12 executes a clockwise rotation about the pivot axis 11, counter to the spring force of the compression spring 18, relative to the actuating lever embodied by the transverse member 1, the actuating lever 2, the gusset plate 3 and the outriggers 4 and 10. The pivot axis 11 continues to move together with the actuating lever 2 and associated parts, embodied by elements 1-4 and 10, over a circular path about the pivot axis 22. In this process, the direction of the force vector engaging the bead portion 15' to be released, via the demounting claw 13, changes. The radially inwardly oriented force component pulls the bead portion 15' radially inward at the engagement point 14, despite the oppositely oriented spring force. By means of an additional force component that may also be present, oriented axially away from the wheel (vertically), which is derived from the force vector acting between the engagement portion 13 and the pivot axis 11, and/or is imparted by the spring force of the compression spring 18, slippage of the demounting claw 13 can be prevented. This process is shown in FIG. 3.

The resultant force component, oriented radially inward in terms of the wheel axis (in the present preferred embodiments, a horizontal force component) is intercepted by the support prongs 24 on the support hoop 23 at the corresponding support points on the tire 7 or wheel flange 8. As already mentioned, the desired radial buckling of the bead portion 15' is not hindered inwardly by the support prongs 24.

Figure 4:
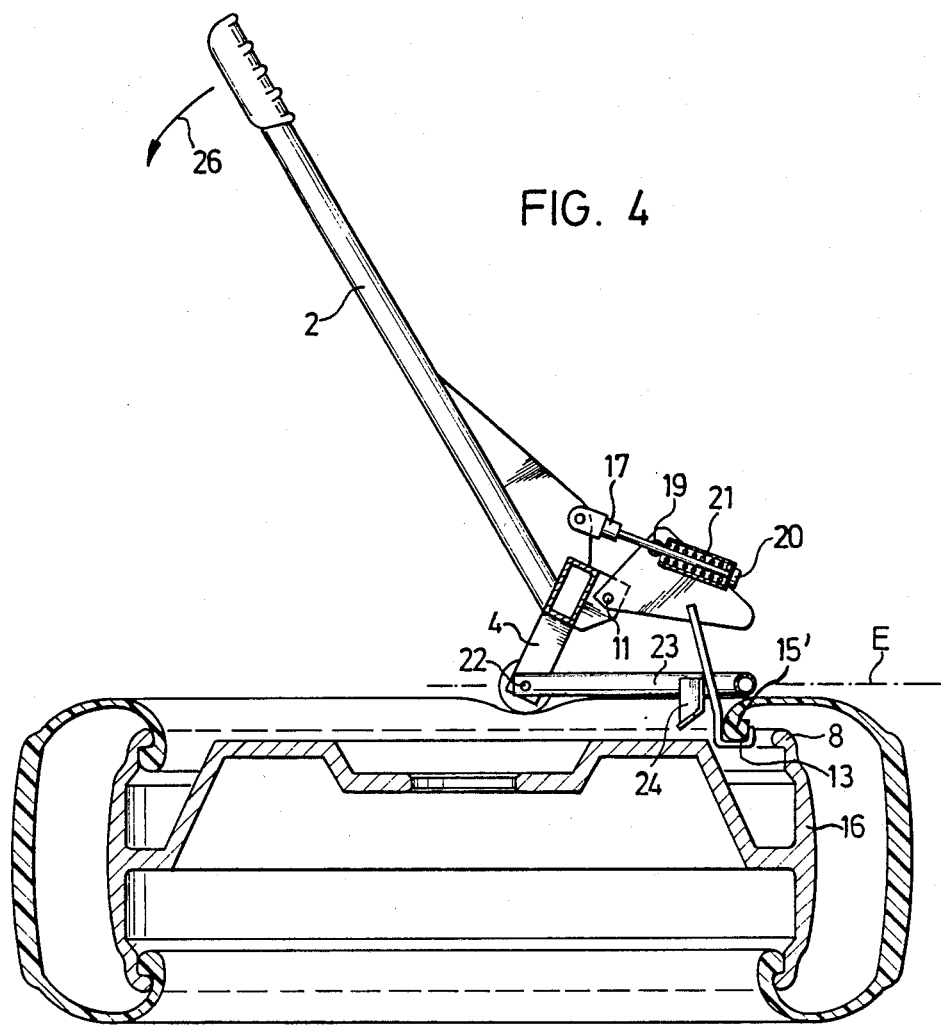

The pivoting motion of the tire bead holder 12 about the pivot axis 11 during the radially inward motion of the demounting claw 13 compresses the compression spring 18, causing the force of the compression spring that is opposed to the radially inward motion to increase. As the demounting operation progresses, or in other words with increased buckling of the bead portion 15' to be released inward at the engagement point 14, the radially inward force component required for this purpose decreases. The radially inward motion of the demounting claw 13 is stopped by the engagement of the stop tube 21. This causes the hinge bolt 19 of the tire bead holder 12 to strike the head of the screw 20, via the stop tube 21. This process is shown in FIG. 4. This stops the clockwise pivoting motion of the tire bead holder 12 about the pivoting axis 11. For performing the second demounting phase, for release of the bead portion 15' from the wheel flange 8 and for the radially inward motion of the demounting claw 13 engaging the bead portion 15' during the pivoting of the actuating lever 2 in the demounting pivoting direction 26, it is essential that the tire bead holder 12 execute a gradual clockwise pivoting motion about the pivoting axis 11, so that substantially only a radially inward motion component or force component is operative on the bead portion 15' to be released. A vertical force component preventing the slippage of the demounting claw 13 from the bead portion 15' is advantageous, but may be unnecessary if structurally dictated means on the tire bead or on the inside face of the rim, for instance in the form of recesses, provide sufficient access for the demounting claw.

Because the pivoting motion of the tire bead holder 12 on the actuating lever 2 about the pivot axis 11 is stopped by means of the stop action imparted by the stop tube 21 in cooperation with the hinge bolt 19 and the head of the screw 20, the termination of the second demounting phase and the transition into the third demounting phase are independent of the force of the spring 18. Accordingly, demounting operations requiring large radially inward forces can also be executed. As FIGS. 3 and 4 show, the second demounting phase is completed once the bead portion 15' to be released has been guided via the outermost radially inward face of the wheel flange 8. The third demounting phase then begins.

In the third demounting phase, because of the blocking of the pivoting motion of the tool bead holder 12 about the pivot axis 11, only the pivot axis 22 is operative as the pivoting motion of the actuating lever 2 in the demounting pivoting direction 28 continues. The predominantly vertical motion of the demounting claw 13 moves the tire bead portion 15' axially away from the wheel, completely past the wheel flange 8. In this position of the bead portion 15', the required radial force component also decreases, so that the tool bead holder 12 can execute a counterclockwise pivot motion about the pivot axis 11 in the direction toward the actuating lever 2. As shown particularly in FIGS. 4 and 5, the demounting claw 13 is disposed on the tool bead holder 12 in such a way with respect to the pivot axis 11 and the pivot axis 22 that with the bead portion 15', it executes a motion radially outward, in an ensuing fourth demounting phase. As a result, the bead portion 15' that is to be lifted is moved completely free of the wheel flange 8 without an additional retention force.

As the bead portion 15' is lifted past the wheel flange 8, the necessary radial support force against the encompassing wheel flange 8 of the support device embodied by the support hoop 23 and support prongs 24 is reduced, so that toward the end of the third demounting phase, the support hoop 23 is also lifted, in common with the released bead portion 15. The support prongs 24 are thus also moved free of the wheel flange 8. The fourth demounting phase with the radially outwardly oriented motion of the released bead portion 15' outside the wheel flange 8 (in the illustrated exemplary embodiment, above the wheel flange 8) can be further reinforced by means of a radially outward rolling motion of the entire tire demounting tool. This is assured if the thrust bearings are embodied as rollers 5, which are rotatable about the pivot axis 22. The fourth demounting phase is further reinforced by decreasing the force, for instance manually at the actuation lever 2, in the direction toward the wheel plane.

With the aid of a tire iron, not shown in detail here, placed between the released tire bead portion 15' and the wheel flange 8 and guided about the circumference of the wheel flange, or by pulling it out manually, the entire tire bead 15 can be released from the wheel flange 8.

The demounting operation performed with the tire demounting tool according to the invention can be divided substantially into four phases. By this means, pneumatic vehicle tires resting with their beads 15 on the rims 16 having radially inwardly oriented encompassing wheel flanges 8, and in which the side walls 27 of the tire wrap from the outside around the wheel flanges 8, can be demounted from the rims 16. To this end, the tire demounting tool requires a single actuating lever which is moved in a single pivoting direction, that is, the demounting pivoting direction 26, during the entire demounting operation. Two pivot axes, namely the pivot axis 22 and the pivot axis 11, come into action in alternation. In the first demounting operation, the pivot axis 22 comes into effect, and the hook-like demounting claw 13 of the tire bead holder 12 is pressed between the tire bead 15 and the radially inner rim face 16 by means of a predominantly axial force vector. A structurally dictated recess on the tire bead or inner surface of the rim 16 may also be provided at the engagement point 14.

In the position of repose or at the beginning of the demounting operation, the two pivot axes 11 and 22, along with the demounting claw 13, assume approximately the following angular positions with respect to one another. The reference point is the pivot axis 22, while the reference plane is the plane E shown in FIGS. 2–5, which extends parallel to the rim body 9 or to the outer tire face, through the pivot axis 22. At the beginning of the first demounting phase or in the position of repose, the pivot axis 11 assumes an angular position of approximately 40° relative to the plane E. As FIG. 2 shows in particular, the demounting claw 13 is then located on the other side of the plane E and assumes an angular position of approximately 20° relative to it. The demounting claw 13 is preferably firmly attached, for instance by welding, to the body of the tire bead holder 12.

During the second demounting phase, the tire bead 15' to be released is pulled inward by the radially inwardly oriented motion component of the demounting claw 13. This second demounting phase is terminated whenever the pivot axis 11 assumes an angle approximately between 55° and 60° with respect to the reference plane E. At this point, the angular position of the demounting claw 13 with respect to the reference plane E has changed only slightly from the original 20° and is approximately 10°.

In the third demounting phase, the tire bead portion 15' which is to be released is guided axially away from the wheel at the wheel flange 8, and the pivot axis 11 is pivoted about the pivot axis 22 until it assumes an angular position of approximately 70°-75° relative to the reference plane E.

Figure 5:
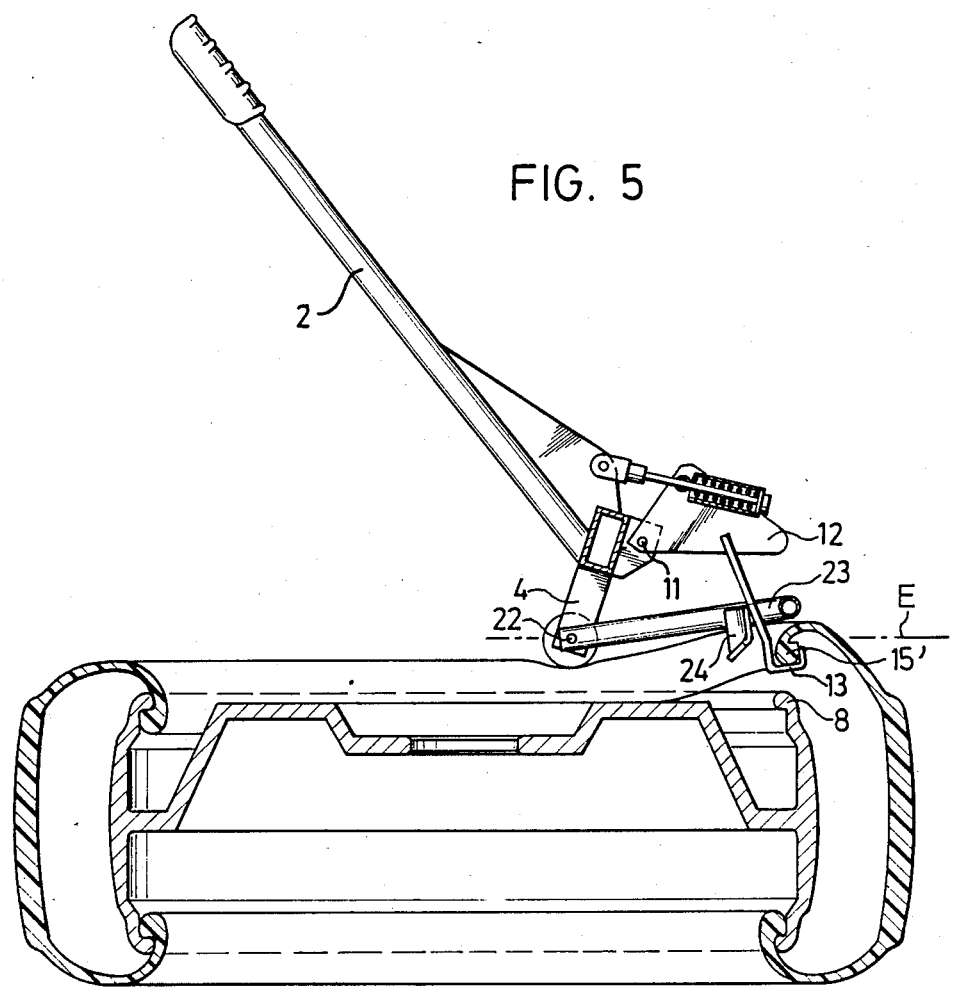

In the final fourth demounting phase the pivot axis 11 is pivoted onward relative to the pivot axis 22 into a terminal position, at an angular position of 75°-80° with respect to the reference plane E. The demounting claw 13 and the lifted bead portion 15' are then located approximately at the level of the reference plane E, or slightly above or below it (FIG. 5).

While the invention has been described in connection with what is presently considered to be the most practical and preferred embodiments, it is to be understood that the invention is not limited to the disclosed embodiment but, on the contrary is intended to cover various modifications and equivalent arrangements included within the spirit and scope of the appended claims.

What is claimed is:

1. A tire demounting apparatus for a tire secured to a wheel having a flange and a rim, comprising:

an actuating means pivotably supported on the wheel about a first pivot axis;

a tire bead holder pivotably supported on the actuating means about a second axis, the tire bead holder having an engagement portion to engage a tire bead of a said tire, so that upon pivoting of the actuating means in a demounting direction the tire bead holder engaging the tire bead pivots in a direction opposite to the demounting direction moving said tire bead initially radially inward, out of range of the wheel flange, and then in the axial direction away from the wheel, the tire bead holder disposed about the second pivot axis creating a motion component oriented axially away from he rim during the radially inwardly direction motion, the tire bead holder being biased by a spring means disposed about the second pivot axis in the demounting pivoting direction; and a first stop means connected to said tire bead holder for limiting the motion of said tire bead holder at a predetermined position, said engagement portion being disposed in such a way relative to the first pivot axis that upon engagement of the stop, further motion of the actuating means in the demounting pivoting direction causes the engagement portion of the demounting tool to produce an axial motion component, so that the tire bead is guided past the wheel flange in the axial direction.

2. A tire demounting apparatus as defined by claim 1, wherein in the position of repose the tire bead holder rests on a second stop.

3. A tire demounting apparatus as defined by claim 2, wherein the engagement portion is disposed in such a way relative to the second pivot axis that upon a pivoting motion of the tire bead holder about the second pivot axis, the engagement portion creates a motion component oriented radially outward with respect to the rim axis.

4. A tire demounting apparatus as defined by claim 3, wherein the engagement portion of the demounting tool is disposed to engage a predetermined recess on the tire bead.

5. A tire demounting apparatus as defined by claim 4 wherein the engagement portion of the demounting tool is disposed to engage a predetermined recess on the tire rim.

6. A tire demounting apparatus as defined by claim 5, wherein a support device supportable on the wheel is provided on the actuating lever so as to intercept a radially inwardly oriented force component.

7. A tire demounting apparatus as defined by claim 6, wherein the support device is supported on the tire and moves along with it in the motion oriented axially away from the rim.

8. A tire demounting apparatus as defined by claim 7 wherein the support device is preferentially pivotably articulated about the first pivot axis on the actuating lever.

9. A tire demounting apparatus as defined by claim 8, wherein the actuating means is supported on the wheel by means of rollers.

10. A tire demounting apparatus as defined by claim 9 wherein the support device is supported on the wheel at at least two support points, at a distance from the engagement portion that assures unhindered release of the tire bead portion to be lifted.

11. A tire demounting apparatus as defined by claim 10, wherein the support device has a support hoop pivotably articulated on the actuating means, said hoop extends approximately along one-half an inside circumference of the tire and has two support prongs forming support points.

12. A tire demounting apparatus as defined by claim 11 wherein the support points are adjustably disposed on the support device.

13. A tire demounting apparatus as defined by claim 12 wherein the rollers with which the actuating means is supported on the wheel are adjustable on the actuating means for varying tire sizes.

14. A tire demounting apparatus as defined by claim 3, wherein the radially outwardly oriented motion component of the engagement portion is further supported by said spring means disposed about said second pivot axis.

* * * * *